United States Patent
Lu et al.

(10) Patent No.: US 11,767,691 B2
(45) Date of Patent: Sep. 26, 2023

(54) MULTI-MODAL VEHICLE DOOR HANDLE

(71) Applicant: INTERLINK ELECTRONICS, INC., Irvine, CA (US)

(72) Inventors: Chee Wai Lu, Singapore (SG); Cheng Seong Lee, Singapore (SG); Hock Cheng Ng, Singapore (SG); Wai Jye Chan, Singapore (SG)

(73) Assignee: INTERLINK ELECTRONICS, INC., Irvine, CA (US)

( * ) Notice: Subject to any disclaimer, the term of this patent is extended or adjusted under 35 U.S.C. 154(b) by 0 days.

(21) Appl. No.: 17/660,833

(22) Filed: Apr. 26, 2022

(65) Prior Publication Data

US 2022/0333411 A1    Oct. 20, 2022

Related U.S. Application Data (63) Continuation of application No. 15/760,567, filed as application No. PCT/US2016/052009 on Sep. 15, 2016, now Pat. No. 11,313,158.

(60) Provisional application No. 62/218,733, filed on Sep. 15, 2015.

(51) Int. Cl.
| | |
|---|---|
| *G01L 1/00* | (2006.01) |
| *E05B 81/76* | (2014.01) |
| *G07C 9/00* | (2020.01) |
| *E05B 81/78* | (2014.01) |
| *G01L 5/16* | (2020.01) |
| *G01L 5/22* | (2006.01) |
| *G01D 5/24* | (2006.01) |

(52) U.S. Cl.
CPC ............. *E05B 81/77* (2013.01); *E05B 81/78* (2013.01); *G01D 5/24* (2013.01); *G01L 1/00* (2013.01); *G01L 1/005* (2013.01); *G01L 5/16* (2013.01); *G01L 5/22* (2013.01); *G07C 9/00944* (2013.01)

(58) Field of Classification Search
CPC ................................................ E05B 81/76–78
See application file for complete search history.

(56) References Cited

U.S. PATENT DOCUMENTS

| | | | | |
|---|---|---|---|---|
| 9,447,613 | B2* | 9/2016 | Salter ................ | G07C 9/00714 |
| 9,459,160 | B2* | 10/2016 | Shaw ..................... | G06F 3/044 |
| 9,664,577 | B1* | 5/2017 | Liljegren .............. | G01L 1/2287 |
| 9,696,839 | B1* | 7/2017 | Bingle ................ | G06F 3/04883 |
| 10,589,672 | B1* | 3/2020 | Chakrapani ............. | E05B 81/77 |
| 2009/0133510 | A1* | 5/2009 | Witte ..................... | H03K 17/94 |
| | | | | 73/862.626 |
| 2013/0168336 | A1* | 7/2013 | Kim ....................... | G01L 1/205 |
| | | | | 29/527.1 |
| 2014/0367975 | A1* | 12/2014 | Sanborn .............. | H03K 17/962 |
| | | | | 292/336.3 |

(Continued)

*Primary Examiner* — Alexander A Mercado
(74) *Attorney, Agent, or Firm* — Maschoff Brennan (57) ABSTRACT

A door handle includes a handle body with an external surface, an internal portion, and a mounting feature configured to couple the handle body to a door. The door handle also includes a force sensing element disposed in the internal portion of the handle body. The first force sensing element is configured to measure a force applied to the external surface of the door handle. The door handle further includes a communication element coupled to the force sensing element. The force measured by the force sensing element is used to determine an output function.

20 Claims, 5 Drawing Sheets

(56) References Cited

U.S. PATENT DOCUMENTS

| | | | |
|---|---|---|---|
| 2016/0251880 A1* | 9/2016 | Bingle | E05B 81/76 |
| | | | 701/49 |
| 2016/0274664 A1* | 9/2016 | Buttolo | H03K 17/96 |
| 2016/0376819 A1* | 12/2016 | Bingle | G07C 9/00658 |
| | | | 70/266 |
| 2016/0377501 A1* | 12/2016 | Agarwal | G01L 25/00 |
| | | | 73/1.15 |
| 2017/0057357 A1* | 3/2017 | Borghi | E05F 15/689 |
| 2017/0059417 A1* | 3/2017 | Kim | G01L 1/142 |
| 2018/0129322 A1* | 5/2018 | Sah | G06F 3/0393 |
| 2019/0006962 A1* | 1/2019 | Lu | G06F 3/0202 |

* cited by examiner

MULTI-MODAL VEHICLE DOOR HANDLE

CROSS-REFERENCE TO RELATED APPLICATION

This application is a continuation of U.S. patent application Ser. No. 15/760,567, filed on Mar. 15, 2018, which is a nationalization of International Patent Application No. PCT/US2016/052009, filed Sep. 15, 2016, which claims priority to U.S. Provisional Patent Application No. 62/218,733, filed on Sep. 15, 2015, the disclosures of each of which are hereby incorporated herein by this reference in their entireties.

FIELD

The embodiments discussed herein are related to a multi-modal vehicle door handle.

BACKGROUND

Modern vehicle entry (e.g., keyless entry) typically includes a combination of wireless security authentication and physical touch sensors on the external vehicle door handle. The physical touch sensors typically are use either mechanical switches or capacitive based touch sensors. Mechanical switches often physically protrude from the door handle surface and have reliability issues. Capacitive based touch sensors typically are not compatible with glove operation and often do not offer rejection of an unintentional touch.

The subject matter claimed herein is not limited to embodiments that solve any disadvantages or that operate only in environments such as those described above. Rather, this background is only provided to illustrate one example technology area where at least one embodiment described herein may be practiced.

BRIEF DESCRIPTION OF THE DRAWINGS

Example embodiments will be described and explained with additional specificity and detail through the use of the accompanying drawings in which.

DESCRIPTION OF EMBODIMENTS

Modern vehicle entry (e.g., keyless entry) typically uses a combination of wireless security authentication and physical touch sensors on the external vehicle door handle. The physical touch sensors typically are use either mechanical switches or capacitive based touch sensors. Mechanical switches often physically protrude from the door handle surface and have reliability issues. Capacitive based touch sensors typically are not compatible with glove operation and often do not offer rejection of an unintentional touch.

Conventional external door handles typically use mechanical switches or capacitive based touch sensors. Conventional mechanical external door handles may have a variety of limitations, including physical protrusion(s) on the door handle surface, mechanical calibration of pre-load in door handle assembly, reduced reliability and durability due to wear and tear in exposure to harsh environment, limited to single discrete triggering level: "on" or "off", and triggering level may not be electronically programmable, to name a few of the limitations. Similarly, drawbacks for conventional external door handles with capacitive based touch sensors may include incompatibility with glove operation, lack or robust rejection of unintentional triggering in exposure to rain or water, limited to single discrete triggering level: "on" or "off," to name of few of the limitations.

Aspects of the present disclosure may, in some embodiments, provide improvements to conventional vehicle door handles through design and implementation of force sensing and haptic feedback within a vehicle door handle subsystem. In at least some embodiments, one or more force sensing elements may be included on a vehicle door handle and may be used to detect a combination of physical input modalities, which may include intentional touch, grip or gesture on respective surfaces of the door handle. The vehicle door handle may also be configured to provide haptic feedback as a physical output modality corresponding to respective physical input modalities. These physical input and output modalities represent vehicle entry functions including but not limited to door unlatching/unlocking and door latching/locking.

In at least some embodiments, a vehicle door handle may include one or more force sensing elements which may provide dynamic force detection and measurement. A system that includes the vehicle door handle may perform computational processing of dynamic force detection and measurement data from each force sensing element to determine discrete touch points, multi-touch points or gestures. The vehicle door handle may include physical stack-up topology that includes a door handle surface, interposer with protrusions, one or more force sensing elements, one or more haptic feedback elements and a housing.

In at least one embodiment, a door handle includes a handle body with an external surface, an internal portion, and a mounting feature configured to couple the handle body to a door. The door handle also includes a force sensing element disposed in the internal portion of the handle body. The first force sensing element is configured to measure a force applied to the external surface of the door handle. The door handle further includes a communication element coupled to the force sensing element. The force measured by the force sensing element is used to determine an output function.

Embodiments of the present disclosure are explained with reference to the accompanying drawings.

For purposes of brevity and clarity, descriptions of embodiments of the present disclosure are directed to a vehicle door handle, although the embodiments are not limited to a vehicle door handle, to a door handle, or to any other interface device. While aspects of the present disclosure will be described in conjunction with the embodiments provided herein and in view of the Figures, it will be understood that the described or illustrated embodiments are not intended to limit the present disclosure to these embodiments. In the following detailed description, specific details are set forth in order to provide a thorough understanding of the present disclosure. However, it will be recognized by an individual having ordinary skill in the art, i.e. a skilled person, that the present disclosure may be practiced without specific details, and/or with multiple details arising from combinations of aspects of particular embodiments. In a number of instances, well-known systems, methods, procedures, and components have not been described in detail as not to unnecessarily obscure aspects of the embodiments of the present disclosure.

Some additional details of these and other embodiments are discussed with respect to the appended figures in which commonly labeled items indicate similar structures unless described otherwise. The drawings are diagrammatic and schematic representations of some embodiments, and are not meant to be limiting, nor are they necessarily drawn to scale. Throughout the drawings, like numbers generally reference like structures unless described otherwise.

Figure 1:
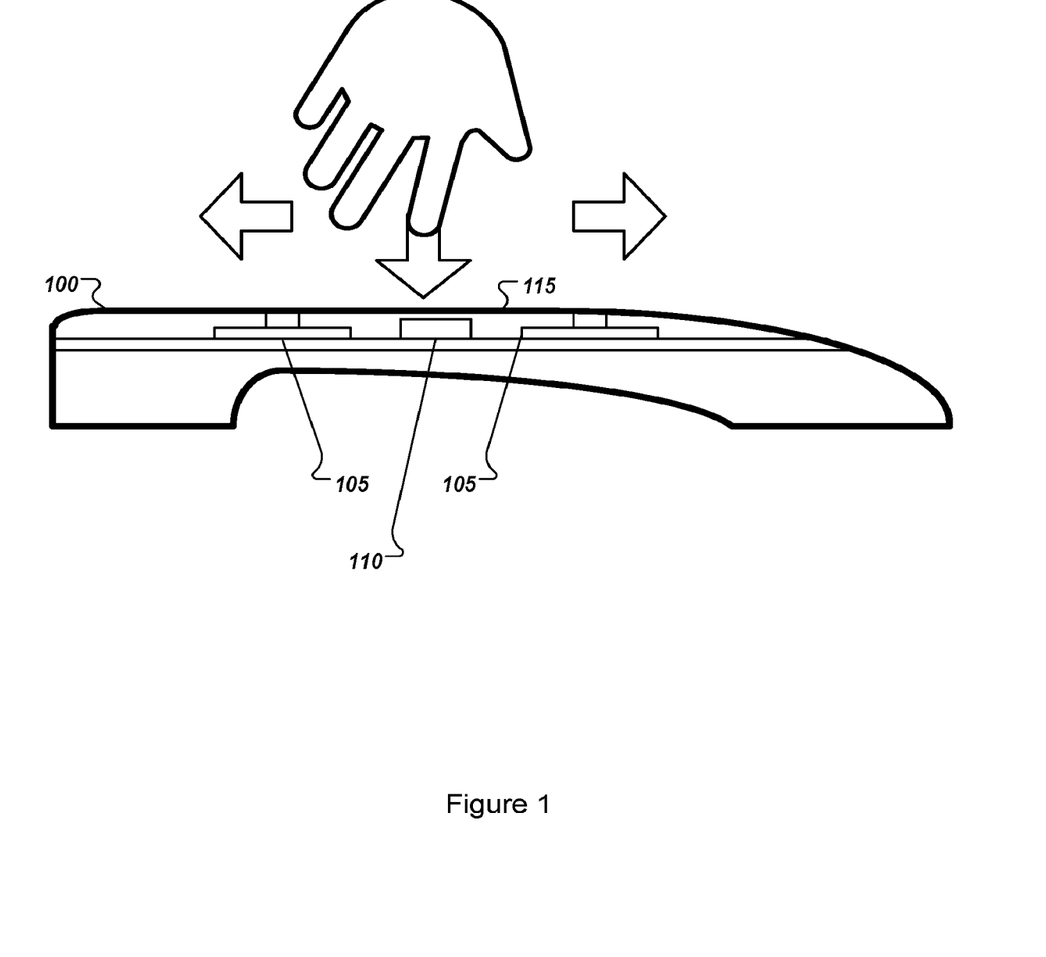
FIG. 1 illustrates an example vehicle door handle with one or more force sensing elements arranged with respect to the vehicle door handle.

FIG. 1 illustrates an example vehicle door handle 100 with one or more force sensing elements 105 arranged with respect to the vehicle door handle 100. A force sensing element 105 may be any type of sensor used to detect and sense force. In at least some embodiments, the force sensing element 105 may also include a capacitive sensor (e.g., a capacitive touch sensor). The physical and electronic arrangement of the at least one force sensing element 105 may provide detection and measurement of an input force profile related to user touch parameters including but not limited to discrete touch points, multi-touch points and/or gestures. Dynamic force detection and measurement may be compatible with substantially rigid and electrically conductive door handle surfaces. The dynamic force detection and measurement data is computationally processed to provide interactive functional control of any vehicle function or operations, such as vehicle entry, where some of the example functions include: door locking/latching, door unlocking/unlatching, trunk locking/latching, driving, braking, or trunk unlocking/unlatching or any other vehicle function.

The haptic feedback element 110 may include a haptic feedback driver and/or a haptic actuator. The haptic feedback driver may receive and process input received via the force sensing element 105 and may translate the input into a haptic response. The haptic response may be any type of physical, optical (e.g., light-based), or audible, or a combination thereof. The haptic feedback driver may communicate the haptic response to the haptic actuator. The haptic actuator may perform the haptic response (e.g., provide a vibration, feedback motion, audible or visual response) via the vehicle door handle 100.

In some embodiments, the vehicle door handle 100 (and/or the force sensing element) is configured to receive and interpret different inputs from an operator of the vehicle door handle. For example, the vehicle door handle 100 may be configured to receive and interpret different inputs to control different operations associated with the vehicle, such as door locking/latching, unlocking/unlatching, starting the vehicle ignition, opening a door or trunk, enabling or disabling a vehicle alarm system, opening or closing vehicle windows, and the like. In at least one embodiment, the vehicle door handle 100 may include an external surface 115 that is configured to receive force input that may be used to control various functions.

The vehicle door handle 100 may be configured to provide a different haptic response for each different input. For example, the vehicle door handle 100 may provide a first vibration pattern to a user in response to receiving an input to unlock the vehicle doors. The vehicle door handle 100 may provide a second vibration pattern in response to receiving an input to lock the vehicle doors.

The vehicle door handle 100 may include one or more processors, a memory, and network communication capabilities. The one or more processors may be specialized processor that are configured to fit within a vehicle door handle 100. Further, the one or more processors may be configured to only execute instructions and/or operations related to various inputs received at the vehicle door handle 100, interpreting the received inputs into a vehicle function and for providing and/or driving a haptic output related to the vehicle function.

In some embodiments, the vehicle door handle 100 is in electrical communication (e.g., wired, wireless) with a processor of a vehicle to which the vehicle door handle 100 may be attached. In such instances, the vehicle door handle 100 may receive force input from a force sensing element 105, communicate the force input to the vehicle processor, and receive an instruction to provide a particular haptic output. The processor of the vehicle may generate another instruction for a different component to perform a function related to the force input.

In at least some embodiments, the vehicle door handle 100 includes a specialized processor that may receive force input from a force sensing element 105, communicate the force input to a vehicle processor, receive an instruction to provide a particular haptic output, and provide a signal or message to a haptic driver to provide the haptic output.

Figure 2:
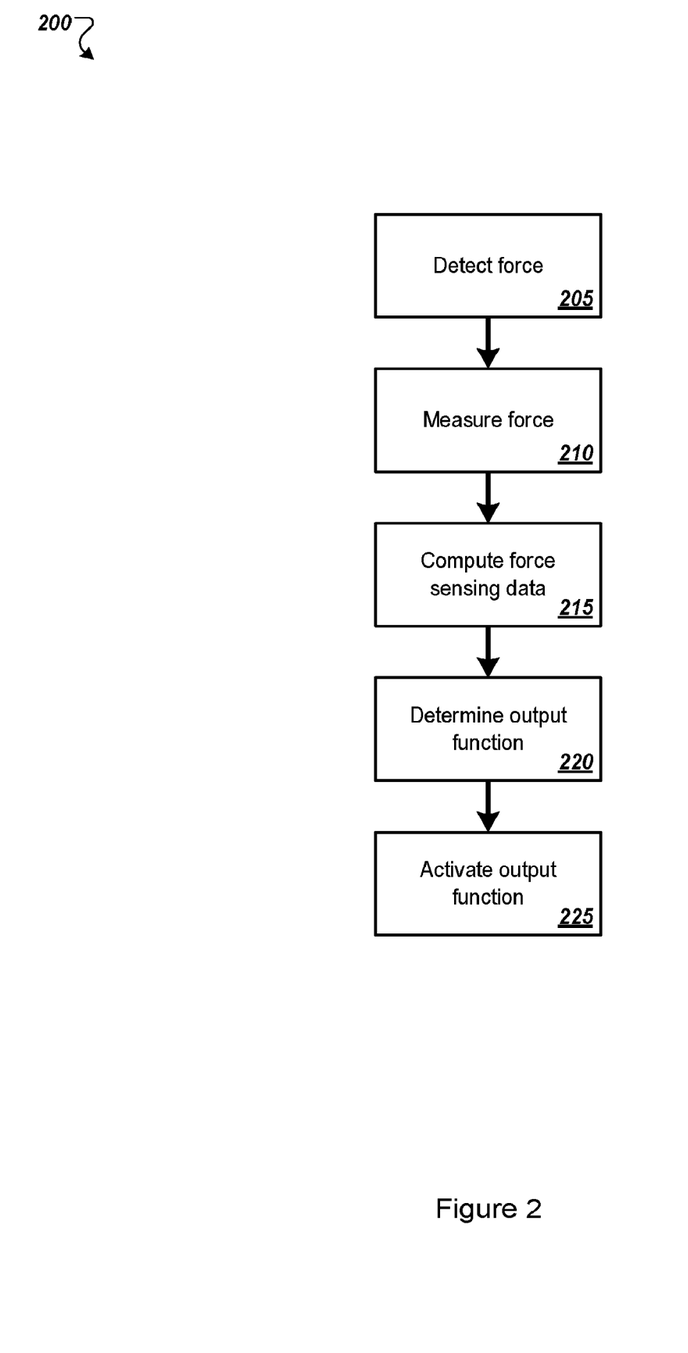
FIG. 2 illustrates a method for dynamic force detection and measurement, computational processing of dynamic force detection and measurement and interactive functional control of the vehicle entry, where the functions include but not limited to door locking/latching or unlocking/unlatching.
Figure 3:
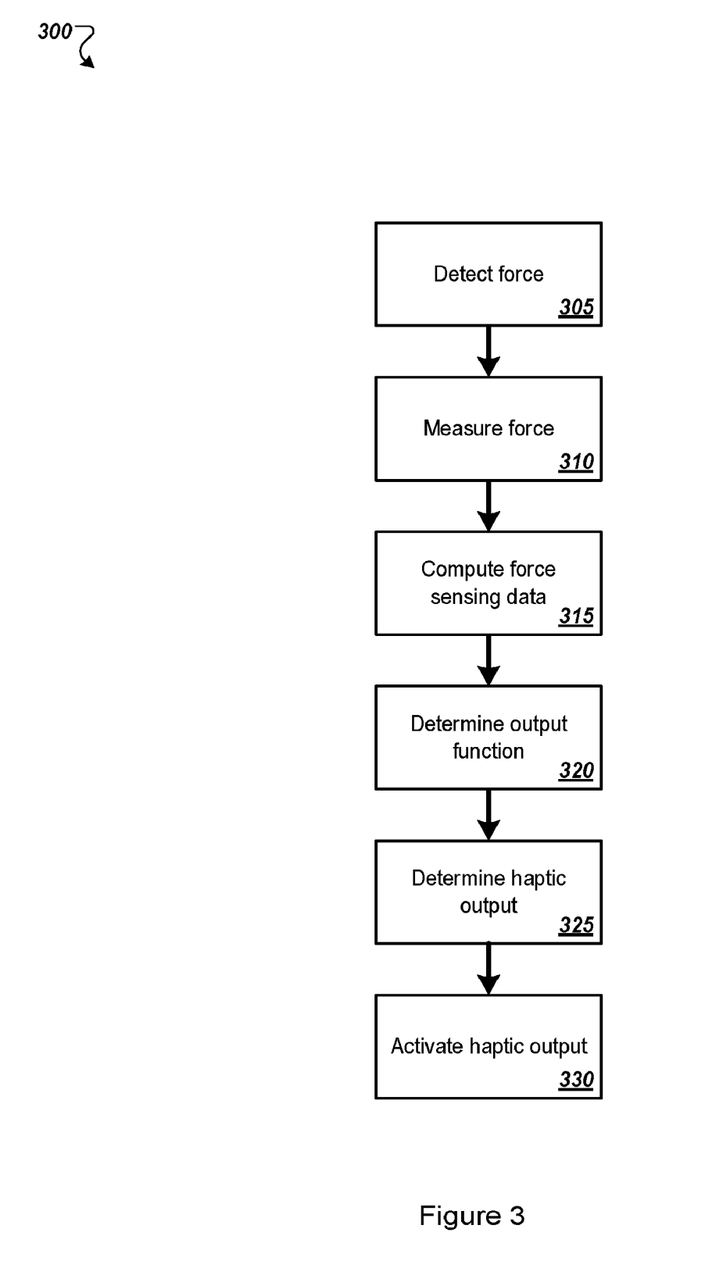
FIG. 3 illustrates a flow diagram of dynamic force detection and measurement, computational processing of dynamic force detection and measurement, and interactive functional control of the vehicle entry where the functions include but not limited to door locking/latching or unlocking/unlatching, and interactive control of haptic feedback profile for haptic feedback elements.

FIGS. 2-3 illustrate flow diagrams that may be used in conjunction with a vehicle door handle. The methods of FIGS. 2-3 may be performed by processing logic that may include hardware (circuitry, dedicated logic, etc.), software (such as is run on a general purpose computer system or a dedicated machine), or a combination of both, which processing logic may be included in a computer system or device. For simplicity of explanation, methods described herein are depicted and described as a series of acts. However, acts in accordance with this disclosure may occur in various orders and/or concurrently, and with other acts not presented and described herein. Further, not all illustrated acts may be required to implement the methods in accordance with the disclosed subject matter. In addition, those skilled in the art will understand and appreciate that the methods may alternatively be represented as a series of interrelated states via a state diagram or events. Additionally, the methods disclosed in this specification are capable of being stored on an article of manufacture, such as a non-transitory computer-readable medium, to facilitate transporting and transferring such methods to computing devices. The term article of manufacture, as used herein, is intended to encompass a computer program accessible from any computer-readable device or storage media. Although illustrated as discrete blocks, various blocks may be divided into additional blocks, combined into fewer blocks, or eliminated, depending on the desired implementation.

FIG. 2 illustrates a method 200 for dynamic force detection and measurement, computational processing of dynamic force detection and measurement and interactive functional control of the vehicle entry, where the functions include but are not limited to door locking/latching or unlocking/unlatching. Computational processing of dynamic force detection and measurement data from each force sensing element may be used to determine a discrete touch point or gesture.

The method of FIG. 2 may begin at block 205, where the processing logic may detect a force via a vehicle door handle. The force may be detected using force sensing element 105, as described in conjunction with FIG. 1.

At block 210, the processing logic may measure the force detected at block 205. In some embodiments, the processing logic may detect a magnitude and a direction of the force. Based on the input force, the processing logic may determine an input force profile related to user touch parameters including but not limited to discrete touch points, multi-touch points and/or gestures.

At block 215, the processing logic may compute force sensing data to determine whether the detected force or input force profile corresponds to an available vehicle function. For example, the input force profile may correspond to a swipe from left to right, which may correspond to unlocking the doors of a vehicle. The processing logic may identify this type of relationship between the detected force and/or input force profile and a valid and available vehicle function.

At block 220, the processing logic may analyze the input force profile and may determine an output function. For example, the processing logic may determine that the input force profile corresponds to particular haptic output (as further described in conjunction with FIG. 3). In at least one embodiment, the input force profile may correlate to an output function. The correlation may be stored in a data storage, such as a database. The processing logic may use the input force profile as a correlation key to identify (e.g., look up) the corresponding output function or functions. In at least one embodiment, the processing logic may generate the correlation key based on the input force profile, such as by taking a hash of the input force profile or raw force sensing data to generate the correlation key. In at least one embodiment, the processing logic may analyze the input force profile to determine a button and a whether a force threshold has been met. For example, an output function may correspond to force on the particular button that is above a minimum force threshold. For example, a button may be physically wired to a predetermined input terminal. The processing logic may determine that force data received at that predetermined input terminal correspond to the particular button. Forces applied to the button that are below the minimum force threshold may not activate the output function. In at least one embodiment, the force profile may also include location data as well as force data. For a force sensing array, a location of the force input on the array may be used to determine the output function. For example, a first area of a door handle may correspond to a trunk open function for a car, a second area of the door handle may correspond to an unlock and/or lock function and a third area of the door handle may correspond to an open and/or close function for the door itself.

At block 225, the processing logic may activate the output function. In at least some embodiments, the output function is a haptic response and the processing logic may provide the haptic response, via the vehicle and/or via the vehicle door handle. In at least one embodiment, the processing logic may cause a haptic driver and/or haptic actuator to provide the haptic response.

FIG. 3 illustrates a flow diagram of a method 300 of dynamic force detection and measurement, computational processing of dynamic force detection and measurement, and interactive functional control of the vehicle entry where the functions include but not limited to door locking/latching or unlocking/unlatching, and interactive control of haptic feedback profile for haptic feedback elements.

The method of FIG. 3 may begin at block 305 where the processing logic may detect a force via a vehicle door handle. The force may be detected using a force sensing element, as described in conjunction with FIG. 1.

At block 310, the processing logic may measure the force detected at block 305. In some embodiments, the processing logic may detect force amplitude. At block 315, the processing logic may compute force sensing data parameters including but not limited to rise time, fall time and pulse width corresponding to the input force profile.

At block 320, the processing logic may analyze the force sensing data and may determine an output function. For example, the processing logic may determine that the detected force corresponds to an available vehicle function.

At block 325, the processing logic may determine a haptic output profile that corresponds with the vehicle function determined at block 320. The vehicle function may correspond to a particular haptic output profile. For example, a vehicle function of starting an ignition may correspond to a particular haptic output profile that indicates to a user who is holding the vehicle door handle, that the vehicle door handle received the input force that corresponds to starting the ignition of the vehicle. At block 330, the processing logic may active the haptic output profile, via the vehicle or via another component attached to the vehicle.

Figure 4:
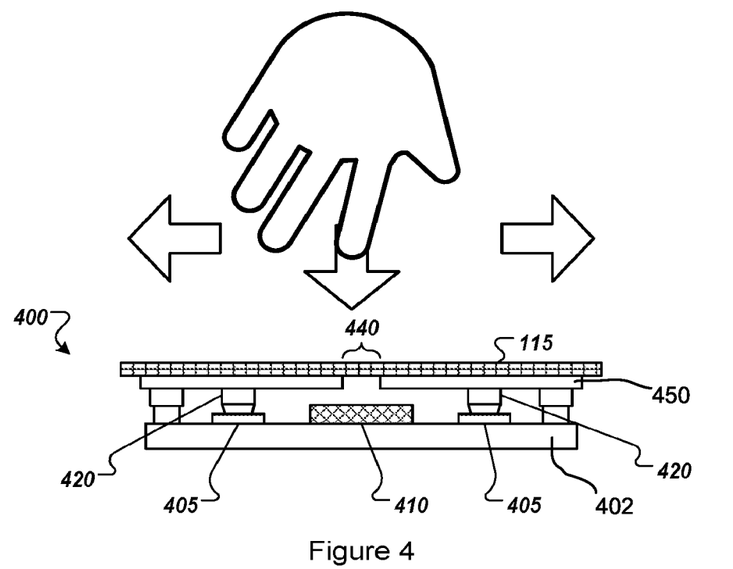
FIG. 4 illustrates physical topology of an example arrangement of one or more force sensing elements and one or more haptic feedback elements on a vehicle door handle.

FIG. 4 illustrates physical topology 400 of an example arrangement of one or more force sensing elements 405 and one or more haptic feedback elements 410 on a vehicle door handle 415. A distributed arrangement of multiple force sensing elements 405 may provide spatially aware (or spatially selective) force sensing. For example, a gap may exist between force sensing elements 405 and other components that may connect to the force sensing elements 405 to provide force isolation, as illustrated by the gap 440. The haptic feedback elements 410 may be physically arranged to provide haptic feedback in close physical proximity to the respective force sensing elements 405 while still providing a decoupled mechanical path between input force application and haptic feedback. In at least one embodiment, a force concentrator or actuator 420 may be disposed between an external surface 115 and a force sensing element 405. The force concentrator or actuator 420 can be used to attenuate or damp the transmitted force from the external surface onto the force sensing element 405. Different types and configurations of force concentrators or actuators can be used to provide different attenuation or damping of the transmitted force. The physical topology 400 may include a base 402 that supports the force sensing elements 405 and the haptic feedback elements 410. The physical topology 400 may also include a plate 450 between the external surface 115 and the force concentrator or actuator 420. In some embodiments, the force sensing elements 405 and the force concentrator or actuator 420 may form a stack. Alternately or additionally, the force sensing elements 405, the force concentrator or actuator 420, and the plate 450 may form a stack.

Figure 5:
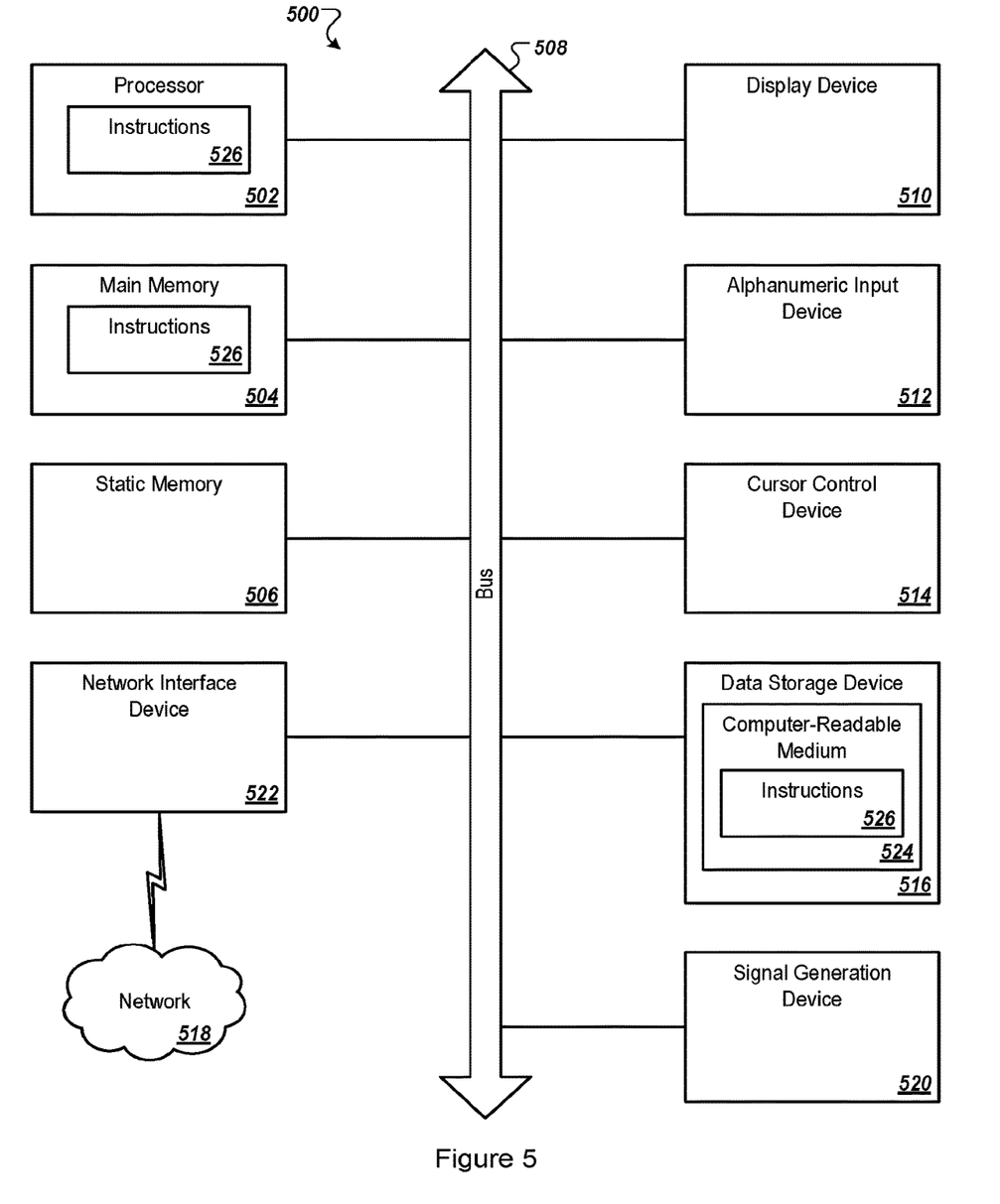
FIG. 5 illustrates a block diagram of an example computer system, all according to at least one embodiment of the present disclosure.

FIG. 5 illustrates a block diagram of an example computer system 500 to receive input and determine an output, according to at least one embodiment of the present disclosure. The vehicle door handle of FIG. 2 may be implemented as a computing system such as the example computer system 500. In other embodiments, the vehicle door handle communicates received force data to a computing system such as the example computer system 500. The vehicle door handle may also receive a command to execute an output function from a computing system such as the example computer system 500. The computer system 500 may be configured to implement one or more operations of the present disclosure.

The computer system 500 executes one or more sets of instructions 526 that cause the machine to perform any one or more of the methodologies discussed herein. The machine may operate in the capacity of a server or a client machine in client-server network environment, or as a peer machine in a peer-to-peer (or distributed) network environment. The machine may be a personal computer (PC), a tablet PC, a set-top box (STB), a personal digital assistant (PDA), a mobile telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute the sets of instructions 526 to perform any one or more of the methodologies discussed herein.

The computer system 500 includes a processor 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage device 516, which communicate with each other via a bus 508.

The processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 502 may also be one or more special-purpose processing devices such as an application specific integrated circuit (ASIC), a field programmable gate array (FPGA), a digital signal processor (DSP), network processor, or the like. The processor 502 is configured to execute instructions for performing the operations and steps discussed herein.

The computer system 500 may further include a network interface device 522 that provides communication with other machines over a network 518, such as a local area network (LAN), an intranet, an extranet, or the Internet. The network interface device 522 may include any number of physical or logical interfaces. The network interface device 522 may include any device, system, component, or collection of components configured to allow or facilitate communication between network components in a network. For example, the network interface device 522 may include, without limitation, a modem, a network card (wireless or wired), an infrared communication device, an optical communication device, a wireless communication device (such as an antenna), and/or chipset (such as a Bluetooth device, an 802.11 device (e.g. Metropolitan Area Network (MAN)), a WiFi device, a WiMax device, cellular communication facilities, etc.), and/or the like. The network interface device 522 may permit data to be exchanged with a network (such as a cellular network, a WiFi network, a MAN, an optical network, etc., to name a few examples) and/or any other devices described in the present disclosure, including remote devices. In at least one embodiment, the network interface device 522 may be logical distinctions on a single physical component, for example, multiple communication streams across a single physical cable or optical signal.

The computer system 500 also may include a display device 510 (e.g., a liquid crystal display (LCD) or a cathode ray tube (CRT)), an alphanumeric input device 512 (e.g., a keyboard), a cursor control device 514 (e.g., a mouse), and a signal generation device 520 (e.g., a speaker).

The data storage device 516 may include a computer-readable storage medium 524 on which is stored the sets of instructions 526 embodying any one or more of the methodologies or functions described herein. The sets of instructions 526 may also reside, completely or at least partially, within the main memory 504 and/or within the processor 502 during execution thereof by the computer system 500, the main memory 504 and the processor 502 also constituting computer-readable storage media. The sets of instructions 526 may further be transmitted or received over the network 518 via the network interface device 522.

While the example of the computer-readable storage medium 524 is shown as a single medium, the term "computer-readable storage medium" may include a single medium or multiple media (e.g., a centralized or distributed database, and/or associated caches and servers) that store the sets of instructions 526. The term "computer-readable storage medium" may include any medium that is capable of storing, encoding or carrying a set of instructions for execution by the machine and that cause the machine to perform any one or more of the methodologies of the present disclosure. The term "computer-readable storage medium" may include, but not be limited to, solid-state memories, optical media, and magnetic media.

Modifications, additions, or omissions may be made to the computer system 500 without departing from the scope of the present disclosure. For example, in at least one embodiment, the computer system 500 may include any number of other components that may not be explicitly illustrated or described.

In one aspect, a door handle includes a handle body includes an external surface, an internal portion, and a mounting feature configured to couple the handle body to a door. The device further includes a first force sensing element disposed in the internal portion of the handle body, the first force sensing element being configured to measure a first force applied to the external surface of the door handle. The device further includes a communication element coupled to the force sensing element, the communication element being configured to send the first force measured by the force sensing element to a processing device.

Implementations can include any, all, or none of the following features. The door handle can include a haptic emission element configured to produce a haptic emission in response to the first force sensing element measuring the first force being applied to the external surface of the door handle. The door handle can include a second force sensing element being disposed at a distal location of the internal portion of the handle body. The first force sensing element can be disposed at a proximal location of the internal portion of the handle body. The first force can be applied to the external surface of the door handle near the proximal location of the internal portion of the handle body, the first force sensing element being configured to detect the first force near the proximal location of the internal portion of the handle body. The application of the first force to the external surface of the door handle can be moved along the external surface from near the proximal location of the internal portion of the handle body to a location near the distal location of the internal portion of the handle body, the second force sensing element being configured to detect the first force near the distal location of the internal portion of the handle body. The magnitude of the first force measured by the first force sensing element decreases as the application of the first force moves along the external surface toward the distal location of the internal portion of the handle body. The magnitude of the first force can be measured by the second force sensing element increases as the application of the first force moves along the external surface toward the distal location of the internal portion of the handle body. The second force sensing element can be configured to detect a second force near the distal location of the internal portion of the handle body. The first force and the second force correspond can be inputs that correspond to a predetermined output function.

In one aspect, a method includes detecting, by a force sensing element, a force on an external surface of a door handle. The method further includes determining an input force profile based on the force detected on the external surface of the door handle. The input force profile corresponds to a predetermined user input. The method further includes determining an output function based on the predetermined user input. The method further includes activating the output function.

Implementations can include any, all, or none of the following features. The output function can include a haptic output. Activating the output function can include causing a haptic element to provide the haptic output via the door handle. The door handle can be a handle of a door of a vehicle. The output function can include a function related to a component of the vehicle other than the door. The door handle can be configured such that the external surface of the door handle does not extend beyond a body of the vehicle. The door handle can be configured to move between at least two positions. The external surface of the door handle does not extend beyond the body of the vehicle when in a first position and wherein the external surface of the door handle extends beyond the body of the vehicle when in a second position.

In one aspect, a system includes a handle body includes an external surface, an internal portion, and a mounting feature configured to couple the handle body to a door. The system further includes a first force sensing element disposed in the internal portion of the handle body, the first force sensing element being configured to measure a first force applied to the external surface of the door handle. The system further includes a memory. The system further includes a processing device operatively coupled to the memory. The processing device is in electronic communication with the force sensing element. The processing device is configured to perform operations includes receive the first force applied to the external surface of the handle body from the first force sensing element. The system further includes determine an output function based on the first force applied to the external surface of the door handle. The system further includes cause the output function to be performed.

Implementations can include any, all, or none of the following features. The system can include a haptic emission element in electronic communication with the processing device. The output function can include a haptic emission. When causing the output function to be performed, the processing device can be configured to generate an instruction for the haptic emission element to produce the haptic emission. The system can include a second force sensing element being disposed at a distal location of the internal portion of the handle body. The first force sensing element can be disposed at a proximal location of the internal portion of the handle body. The first force can be applied to the external surface of the handle body near the proximal location of the internal portion of the handle body, the first force sensing element being configured to detect the first force near the proximal location of the internal portion of the handle body. The application of the first force to the external surface of the handle body can be moved along the external surface from near the proximal location of the internal portion of the handle body to a location near the distal location of the internal portion of the handle body, the second force sensing element being configured to detect the first force near the distal location of the internal portion of the handle body. The magnitude of the first force measured by the first force sensing element decreases as the application of the first force moves along the external surface toward the distal location of the internal portion of the handle body. The magnitude of the first force can be measured by the second force sensing element increases as the application of the first force moves along the external surface toward the distal location of the internal portion of the handle body. The second force sensing element can be configured to detect a second force near the distal location of the internal portion of the handle body.

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, etc.) of the computing system. In at least one embodiment, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations or a combination of software and specific hardware implementations are also possible and contemplated. In the present disclosure, a "computing entity" may be any computing system as previously defined in the present disclosure, or any module or combination of modulates running on a computing system.

Terms used in the present disclosure and especially in the appended claims (e.g., bodies of the appended claims) are generally intended as "open" terms (e.g., the term "including" may be interpreted as "including, but not limited to," the term "having" may be interpreted as "having at least," the term "includes" may be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases may not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" may be interpreted to mean "at least one" or "one or more"); the same holds true for the use of definite articles used to introduce claim recitations.

In addition, even if a specific number of an introduced claim recitation is explicitly recited, those skilled in the art will recognize that such recitation may be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, may be understood to contemplate the possibilities of including one of the terms, either of the terms, or both terms. For example, the phrase "A or B" may be understood to include the possibilities of "A" or "B" or "A and B."

All examples and conditional language recited in the present disclosure are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, various changes, substitutions, and alterations may be made hereto without departing from the spirit and scope of the present disclosure.

What is claimed is:

1. An interface device comprising:
   an external surface configured to receive a force;
   a plurality of plates coupled to the external surface, each of the plurality of plates physically separated from other of the plurality of plates to provide force isolation between the plurality of plates, at least two of the plurality of plates physically separated by a gap;
   a plurality of force sensing elements, each of the force sensing elements coupled to one of the plurality of plates and configured to measure the force received by the external surface; and
   a haptic feedback element positioned so that a portion of the haptic feedback element overlaps at least a portion of the gap.

2. The device of claim 1, further comprising a plurality of actuators, each of the plurality of actuators disposed between one of the plurality of plates and one of the plurality of force sensing elements.

3. The device of claim 2, wherein each of the plurality of actuators is configured to attenuate the force transmitted from the external surface onto the plurality of force sensing elements.

4. The device of claim 1, further comprising a base configured to support the plurality of force sensing elements, the plurality of force sensing elements positioned between the base and the external surface, wherein the haptic feedback element is positioned so that the portion of the haptic feedback element directly aligns with the gap between the base and the external surface.

5. The device of claim 1, wherein the haptic feedback element is configured to produce a haptic emission in response to one or more of the force sensing elements measuring a first force being applied to the external surface of the device.

6. The device of claim 1, wherein the haptic feedback element is positioned between the plurality of force sensing elements and aligned with the gap.

7. The device of claim 1, further comprising an electronic communication element coupled to the plurality of force sensing elements, the electronic communication element being configured to send the force measured by the plurality of force sensing elements to a processing device.

8. The device of claim 1, wherein at least one of the plurality of force sensing elements is configured to measure the force and an accompanying lateral movement along the external surface, the force and the accompanying lateral movement indicative of a gesture applied to the external surface.

9. A device comprising:
   an external surface;
   a first stack coupled to the external surface and configured to measure force received by the external surface;
   a second stack coupled to the external surface and configured to measure force received by the external surface, wherein the first stack is separated from the second stack by a gap; and
   a haptic feedback element positioned so that a portion of the haptic feedback element overlaps at least a portion of the gap.

10. The device of claim 9, wherein the first stack includes a plate, an actuator, and a force sensing element, wherein the plate is coupled to the external surface and the actuator is disposed between the plate and the force sensing element.

11. The device of claim 10, wherein the actuator is configured to attenuate a force transmitted from the external surface onto the force sensing element.

12. The device of claim 9, further comprising a base configured to support the first and second stacks, the first and second stacks positioned between the base and the external surface, wherein the haptic feedback element is positioned so that the portion of the haptic feedback element directly aligns with the gap between the base and the external surface.

13. The device of claim 9, wherein the haptic feedback element is configured to produce a haptic emission in response to one of the first and second stacks measuring a first force being applied to the external surface of the device.

14. The device of claim 9, wherein the haptic feedback element is positioned with respect to the external surface such that the haptic feedback provided by the haptic feedback element is transmitted to the external surface through at least the first and second stacks.

15. The device of claim 9, further comprising an electronic communication element coupled to the first and second stacks, the electronic communication element being configured to send a force measured by the first and second stacks to a processing device.

16. The device of claim 9, wherein a force sensing element of the first stack is configured to measure a force and an accompanying lateral movement along the external surface, the force and the accompanying lateral movement indicative of a gesture applied to the external surface.

17. A method, comprising:
   detecting, by a first force sensing element of a first stack, a first force on an external surface of a handle;
   detecting, by a second force sensing element of a second stack, a second force on the external surface of the handle, the first stack is separated from the second stack by a gap; and
   causing a haptic feedback element to provide a haptic output in response to one or more of the first force and the second force, wherein the haptic feedback element is positioned so that a portion of the haptic feedback element overlaps at least a portion of the gap.

18. The method of claim 17, further comprising:
- determining an input force profile based on one or more of the first force and the second force; and
- activating an output function of a device that includes the first force sensing element and the second force sensing element based on the determined input force profile.

19. The method of claim 18, wherein the handle is part of a door of a vehicle, wherein the output function includes a function related to a component of the vehicle other than the door.

20. The method of claim 19, wherein the handle is configured such that the external surface of the handle does not extend beyond a body of the vehicle.

* * * * *